Oct. 24, 1944. J. K. HELLER Re 22,556

GAS MIXING APPARATUS

Original Filed Feb. 4, 1933 2 Sheets-Sheet 1

INVENTOR
John K. Heller
BY
A. Durham Owen
ATTORNEY.

Oct. 24, 1944. J. K. HELLER Re 22,556

GAS MIXING APPARATUS

Original Filed Feb. 4, 1933 2 Sheets-Sheet 2

INVENTOR
John K. Heller
BY
Duncan Owen
ATTORNEY.

Reissued Oct. 24, 1944

Re. 22,556

UNITED STATES PATENT OFFICE 22,556

GAS MIXING APPARATUS

John K. Heller, San Francisco, Calif., assignor, by mesne assignments, to Gasair Corporation, San Francisco, Calif., Original No. 2,023,809, dated December 10, 1935, Serial No. 655,237, February 4, 1933. Application for reissue August 1, 1944, Serial No. 547,604

2 Claims. (Cl. 48—184)

This invention relates to an automatic machine particularly intended for handling gases, such as butane, etc., in liquid form, the machine functioning to convert the liquid into gas and to automatically mix the gas with a predetermined quantity of air. The invention also relates to a method of distribution prior to and after conversion into gas.

Butane, pentane, and similar gases, which may be maintained in liquid form under fairly low pressure, are extensively used for heating and lighting purposes.

Different methods are employed for converting the liquids into gas and for diluting the same with air as their B. t. u. content is very high, but practically all methods, as far as I am aware, bleed the liquid down to a low pressure through reducing valves, or the like, thereby wasting considerable power. Other power, usually electrically driven compressors, is then employed to recompress the gas and air to mix the same before the gas is delivered to the supply mains for distribution and use. Such methods require a central mixing station or plant and pipe lines or mains to supple the consumers, and the capacity of both plant and mains must be comparatively large to take care of peak loads.

The object of the present invention is generally to improve and simplify the construction and operation of apparatus of the character described; to provide a machine or apparatus which is adapted to make use of the power available in the expansion of liquid gases of the character described to introduce the air or other gases required for dilution purposes; to provide an apparatus which is capable of handling loads from minimum to peak and which is entirely automatic in operation over the entire range of load; and further, to provide a method of distribution and mixing which reduces cost of plant and distributing lines to a minimum.

The apparatus and the method of distribution employed is shown by way of illustration in the accompanying drawings in which—

Fig. 3 is an enlarged vertical section of the valve indicated at 14a.

Figure 4:
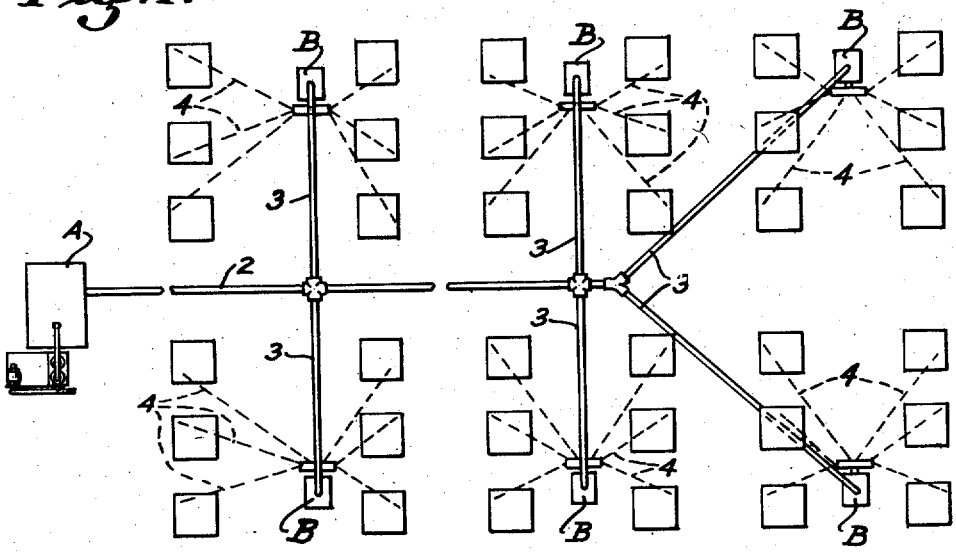
Fig. 4 is a diagrammatic view showing the method of distributing the gas prior to and after mixing.

Referring to the drawings in detail, and particularly to Fig. 4, which is a diagrammatic view of a small town showing the method of distribution prior to and after mixing of the gas, it may be stated that the gas, for instance butane, in liquid form is delivered to the town and is placed in a main tank, such as indicated at A. The gas in liquid form is then distributed through a main pipe line 2 and branch lines 3 to mixing machines generally indicated at B, these machines being located in different districts of the town. The gas in liquid form is thus delivered to different districts. It is here converted into gas and mixed with air in the machines indicated at B, and is then distributed in the form of a mixed gas through pipe lines, indicated at 4, which deliver the gas to the consumers. In Fig. 4, six mixing machines are shown. These machines are all identical in construction and operation and the description of one will accordingly suffice.

Figure 1:
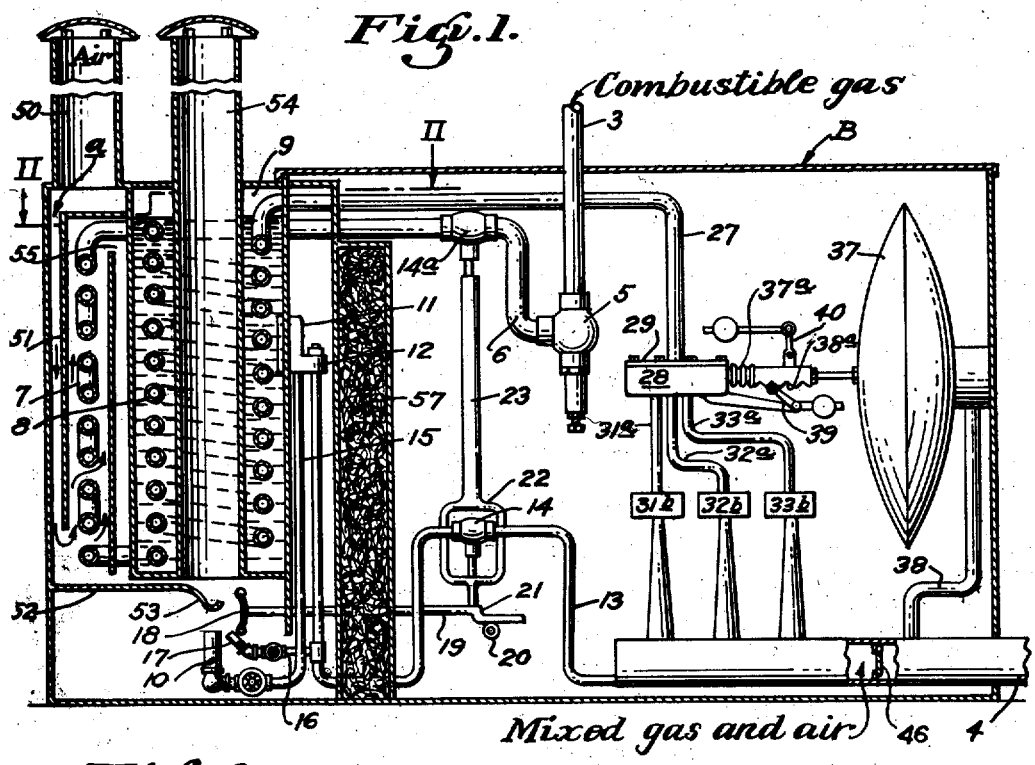
Fig. 1 is a central vertical section of the mixing apparatus.
Figure 2:
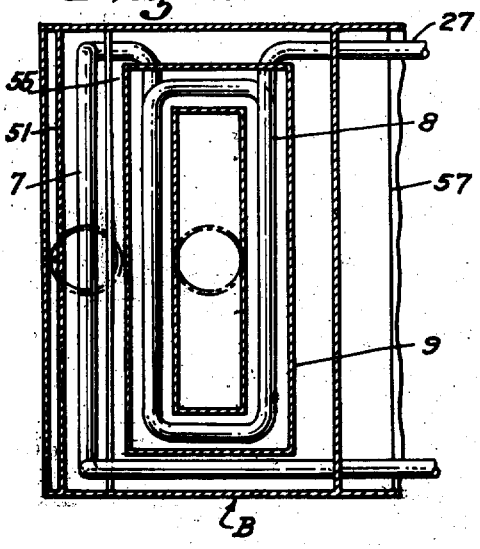
Fig. 2 is a plan section taken on line II—II of Fig. 1.

An enlarged vertical sectional view of the mixing machine is shown in Fig. 1. In this view, B indicates a housing of any suitable construction. Mounted within the housing is a reducing valve 5 of any suitable construction to which gas in liquid form is delivered through the pipe 3. This pipe is connected with one side of the reducing valve and a pipe 6 is connected with the other side. The liquid in more or less gaseous form, after passing through the reducing valve, enters pipe 6 and this is connected with a coil generally indicated at 7. The gas in passing through this coil is expanding and produces a cooling or refrigerating effect, and this effect is utilized to remove any excess moisture from the air which is to be utilized for mixing purposes. The gas, after passing through the coil 7, enters a second coil generally indicated at 8, and this is maintained in a submerged condition in a tank 9 placed within the housing B, said tank containing a heating fluid such as water, oil, or the like, which is maintained at a predetermined temperature by a burner indicated at 10. A thermostat 11 is actuated by the liquid in the tank 9 and this controls a valve 12 which, in turn, regulates the flow of gas to the burner 10, the function of the thermostat being that of maintaining the liquid at a predetermined temperature under all conditions of operation. The burner 10 is supplied with gas from a main, generally indicated at 4, through means of a pipe 13. This pipe passes through a valve 14 and is then connected with the thermostat control valve 12, and after passing through that valve, it enters pipe 15 which is connected with a burner. A by-pass pipe 16 is also employed and this serves as a constant feeder to a pilot burner indicated at 17.

Figure 3:
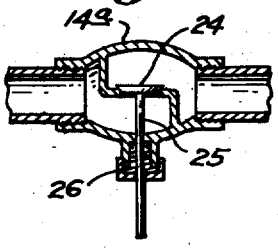

Under certain conditions of operation it may happen that the pilot burner becomes extinguished and under such conditions it is desirable to shut off the gas supply both to the pilot burner and to the coils 7 and 8. This is accomplished as follows: Mounted directly above the pilot burner 17, or closely adjacent the same, is a thermostat 18 of the bi-metallic type, or the like, and connected thereto is a rod 19, the opposite side of which is supported by a roller 20. A shoulder 21 is formed on the rod and this shoulder supports a yoke 22 having a rod-like extension 23 on its upper end. Mounted on the pipe line 6 is a valve 14ª. This valve is similar to valve 14 in construction, and by referring to Fig. 3 the construction of both valves is plainly shown. For instance, the interior of the valve 14ª is provided with a disc valve 24 which is carried by a stem 25. This projects through a stuffing box 26. The lower end of the stem is engaged by the extension 23 and as the yoke is normally held in raised position by the shoulder 21, both valves will normally be opened, but if the pilot light should become extinguished for any reason whatsoever thermostat 18 will cool and will bow in a direction opposite to that shown in Fig. 1, thereby imparting longitudinal movement to the rod 19. Shoulder 21 will thus move out of engagement with the yoke 22 and will drop by gravity, thus causing both valves 14 and 14ª automatically to close and the mixing machine as a whole will become inoperative.

Figure 5:
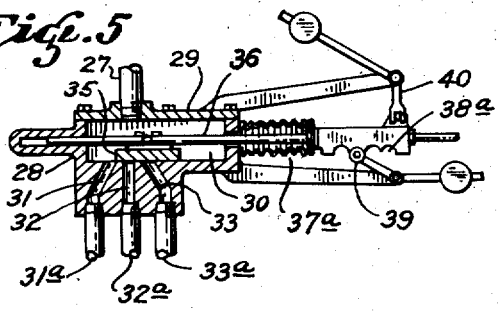
Fig. 5 is an enlarged vertical sectional view of the slide valve.

Suppose on the other hand that the valves are open and the machine is functioning under normal conditions. If that is the case, the gas from the reducing valve 5 will pass through the coil 7 and then through the coil 8, and as that coil is submerged in a heated fluid, the temperature of the gas will be raised to a predetermined point. After leaving the coil 8 the gas passes through a pipe 27 which is connected with a slide valve, generally indicated at 28. This valve is best illustrated in Fig. 5. It consists of a housing having a cover member 29. A chamber 30 is formed within the housing to which the gas from pipe 27 is delivered. Three discharge ports 31, 32 and 33 are formed in the housing and these communicate with pipes 31ª, 32ª and 33a, and these pipes in turn communicate with a series of aspirators, generally indicated at 31ᵇ, 32ᵇ, and 33ᵇ, hereinafter to be described. A valve 35 is slidably mounted interior of the valve housing and is adapted to open and close the ports 31, 32 and 33. The valve is actuated by a stem 36 and this is, in turn, actuated by a bellows-type of diaphragm generally indicated at 37. This diaphragm is connected through a pipe 38 with the supply main or pipe 4 and as the gas pressure in this main increases or decreases, diaphragm 37 will expand or contract. If the pressure in the line 4 has reached the predetermined maximum, then bellows or diaphragm 37 will reach its point of maximum expansion. Rod 36 will accordingly be moved inwardly with relation to the valve housing 28 and will accordingly transmit movement to the valve 35 to close all of the ports 31, 32 and 33. On the other hand, if the gas pressure drops below the maximum in the main 4, the diaphragm 37 will contract, rod 36 and valve 35 will move in the opposite direction and port 31 will be opened. If there is a further pressure drop port 32 will also be opened, and under conditions of maximum load, all three ports will be opened.

Figure 6:
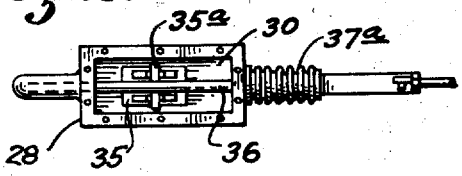
Fig. 6 is a plan view of the slide valve showing the cover removed.

Valve 35 is held on its seat merely by pressure of gas within the housing and it should be as freely movable as possible to prevent binding or sticking. To accomplish this, lugs are formed on opposite ends of valve 35 and a cross rod 35ª, see Fig. 6, engages these lugs. A floating connection is thus formed between the rod 36 and the valve and binding or sticking is prevented, and in order to prevent any leakage at the point where the rod 36 extends through the valve housing a bellows-type of diaphragm, such as indicated at 37ª, may be employed. Ratchet teeth or detents, such as indicated at 38ª, are also formed on the rod and these are engaged by a weight actuated roller 39, the function thereof being to transmit a step by step movement to the valve during its movement in one direction or another. Movement of the rod 36 and the valve in one direction is obtained by the expanding action of the bellows or diaphragm 37, and movement in the opposite direction as the diaphragm contracts is insured by a weight actuated lever 40, or the like.

Figure 7:
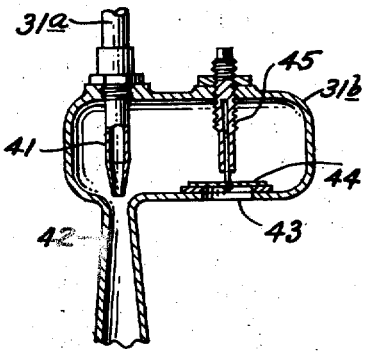
Fig. 7 is an enlarged vertical sectional view of one of the aspirators.

The aspirators, indicated at 31ᵇ, 32ᵇ and 33ᵇ, are all identical in construction and the description of one will suffice. An enlarged sectional view of one of the aspirators is shown in Fig. 7. It consists of a casing 31ᵇ with which pipe 31ª is connected. This pipe terminates in a nozzle 41 and this discloses the upper end of a Venturi-shaped tube 42. An opening 43 is formed in the housing and this is normally closed by means of a disc valve 44. This valve is provided with a stem which is guided in an adjustable bushing 45 and this bushing also functions to limit the lift of the valve. When port 31 is opened or uncovered by the valve 35, gas under pressure will discharge through pipe 31ª and through nozzle 41. An injector action is obtained at the throat of venturi 42. A slight evacuated condition is thus produced within the housing, causing valve 44 to open. Air is in this manner introduced through the opening 43 and is mixed and discharged with the gas through the venturi 42. This is, in turn, connected with a main or supply line 4 and the gas mixed with the proper proportion of air is thus conducted to the consumer; the proportion of air required being obtained by adjusting the lift of the valve 44 through means of the bushing 45 and any proportion desired can thus be obtained and will be automatically maintained when the apparatus is in operation. A check valve 46 is mounted in the supply main 4 so as to prevent a back rush of gases when valve 35 is closed.

In actual operation it will be noted that the gas in liquid form is delivered through the pipe lines 2 and 3 to the mixing apparatus. The gas passes through the reducing valve 5, then through pipe 6 and coils 7 and 8. It finally passes through pipe 27 into slide valve housing 28 and then through one or more of the pipes 31*a*, 32*a*, etc., into the aspirators and finally into the supply line 4. The air employed for mixing purposes enters the housing through a pipe 50, see Fig. 1. It passes downwardly in the direction of arrow *a* between the end of the housing B and a plate 51. It then passes in under the plate 51 and upwardly in the direction of the arrow around the coils 7. These coils are cooled by the refrigerating action previously described due to the expansion of the gases, and if any excess moisture is contained in the air it will be precipitated the moment the dew point is reached. Any moisture precipitated drains to a bottom plate 52 which terminates in a pan 53. This is disposed directly above the burner 10 and accumulation of moisture is thus prevented as it is evaporated as fast as it reaches the pan and will thus escape through the stack or flue generally indicated at 54. The air, after passing over the cooling coil 7, discharges through an opening 55. It then passes around the heater housing 9 and then through an air filter 57 of suitable construction. It finally enters the main chamber of the housing B, but before entering said chamber has been ridden of dust and dirt, excess moisture has been removed, and its temperature has been raised due to passage around the heating bath 9. From the main chamber B the air is admitted to the aspirator housings 31b, etc., through valves 44 and at this point is mixed with the gas and delivered to the main 4. The air entering the pipe 50 serves two purposes, first that of supplying the aspirators 31b, etc., and secondly that of supplying the burner 10 and the pilot light 17 with air to support combustion. The air entering pipe 50, as previously stated, passes downwardly in front of the plate 51 then upwardly between the coil 7 and then discharges through the opening 55 and passes around the heater housing 9, and finally passes through the filter 57 into chamber B.

By referring to Fig. 1, it will be noted that there is a passage in front of the filter and that the passage communicates at the lower end with the chamber in which the burner 10 and the pilot light 17 are positioned. When the apparatus is in operation there will be a suction in chamber B due to the action of the aspirators 31b, 32b, 33b, and there will similarly be a suction in the chamber containing the burners due to the flow of burnt gases upwardly through the stack 54, hence air passing around the heater housing 9 and entering the passage in front of the filter will be pulled, part of it, into the chamber B to supply the aspirators and part of it into the chamber containing the burners so as to supply air for combustion; the flow of air from the passage being automatically directed through the filter or down into the combustion chamber as conditions demand.

By employing the method of expanding and distributing liquid gases, such as disclosed in this application, outside power is eliminated as the apparatus makes use of the power available in the expansion of the liquid gases to draw the air necessary for dilution. A so-called main plant is also eliminated as the main plant or station employed in this instance is nothing more or less than a large tank or container which functions as a receiver and a source of supply for the liquid gas. By distributing the gas in liquid form small pipes may be run to different points or districts of the town. Small shallow ditches are sufficient for this purpose reducing cost of installation, and as the size of the pipe is small compared with the usual type of gas distributing mains, the cost of piping is very materially reduced. Further, the distributing pipes connecting the gas mixing machines with the consumers in each district may also be small as they serve a comparatively small number of consumers in each instance, hence the piping throughout is small when comparison is made with the usual plants. A system of this character also lends itself to considerable expansion without material additional cost, as the addition of one or more mixing machines on a line does not materially affect the capacity of the liquid lines supplying the same. All the mixing plants are entirely automatic in operation and as such require comparatively little service and attention. All of this materially reduces cost of gas distribution and service which is one of the important factors, particularly in small town service.

The mixing machines receive the gas in liquid form. The expansion force releases considerable power and this power is utilized in the present instance as it functions as a means for drawing in the air required for dilution. The power obtained by vaporization is also utilized to dehumidify the air employed as it removes excess moisture and to that extent eliminates the bug-a-boo of internal corrosion. The gases which evaporate or expand at comparatively low pressure and temperatures may be employed, for instance such as casing-head gasoline, hence if the temperature should be to low to evaporate casing-head gasoline a slight increase in the temperature of the heating bath will produce the required temperature and fuels of different character are thus available. The mixing machines may be employed for mixing gases other than those described, for instance it may be used in chemical plants and the like.

Mixing machines may also be made in the form of portable units for use of present gas companies as an aid in repair work, as it often happens that repair work must be done on a gas line feeding a group of houses. It would ordinarily involve shutting off the service to these houses but by hooking up a portable tank and mixing machine, the apparatus will supply gas to the group of houses while the line is under repair.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:

1. In a gas mixing apparatus of the character described a plurality of aspirator housings, each having a suction producing nozzle, a check valve controlled air inlet for each housing and nozzle, a valve housing connected with a source of gas supply under pressure, a plurality of gas valve ports, a plurality of pipes each connecting a gas port in its housing with its respective aspirator nozzle, a valve in the valve housing movable to shut off or supply gas under pressure through said gas ports to one or several or all of the aspirator nozzles, a gas supply main into which the several aspirators discharge, and means actuated by variations in pressure in said main for moving the valve to open or close said gas ports one at a time to shut off or supply gas under pressure therethrough to one or to several or to all of the nozzles in the respective aspirators in a step by step sequence.

2. In a gas mixing apparatus of the character described a plurality of aspirator housings, each having a suction producing nozzle, a check valve controlled air inlet for each housing and nozzle, a valve housing connected with a source of gas supply under pressure, a plurality of gas valve ports, a plurality of pipes each connecting a gas port in its housing with its respective aspirator nozzle, a valve in the valve housing movable to shut off or supply gas under pressure through said gas ports to one or several or all of the aspirator nozzles, a gas supply main into which the several aspirators discharge, a housing having a diaphragm, said housing being connected with the gas supply main and the diaphragm being actuated by pressure variations in the main, and means actuated by movement of the diphragm for transmitting movement to the valve in the valve housing so as automatically to open or to close said ports one at a time to shut off or supply gas under pressure to one or all of the nozzles in the respective aspirators in a step by step sequence.

JOHN K. HELLER.